(12) United States Patent
Koizumi et al.

(10) Patent No.: US 10,074,467 B2
(45) Date of Patent: Sep. 11, 2018

(54) RESISTANCE ELEMENT AND METHOD FOR MANUFACTURING THE SAME

(71) Applicant: Murata Manufacturing Co., Ltd., Kyoto-fu (JP)

(72) Inventors: Kazuya Koizumi, Nagaokakyo (JP); Kazutoshi Sugii, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 15/842,336

(22) Filed: Dec. 14, 2017

(65) Prior Publication Data
US 2018/0197664 A1   Jul. 12, 2018

(30) Foreign Application Priority Data

Jan. 6, 2017   (JP) .................. 2017-001424

(51) Int. Cl.
| | |
|---|---|
| *H01C 7/10* | (2006.01) |
| *H01C 10/14* | (2006.01) |
| *H01C 1/032* | (2006.01) |
| *H01C 17/06* | (2006.01) |
| *H01C 3/10* | (2006.01) |

(52) U.S. Cl.
CPC .............. *H01C 10/14* (2013.01); *H01C 1/032* (2013.01); *H01C 3/10* (2013.01); *H01C 17/06* (2013.01)

(58) Field of Classification Search
CPC .......... H01C 10/14; H01C 1/032; H01C 3/10; H01C 17/06

USPC ....................................... 338/20, 13
See application file for complete search history.

(56) References Cited

U.S. PATENT DOCUMENTS

| | | | | |
|---|---|---|---|---|
| 7,211,199 | B2 * | 5/2007 | Chen ................... | G11C 11/5685 252/500 |
| 7,652,554 | B2 * | 1/2010 | Moriai ................ | H01C 7/1006 338/61 |
| 7,978,047 | B2 * | 7/2011 | Hosoi ................. | G11C 13/0007 338/20 |
| 8,912,874 | B2 * | 12/2014 | Otsubo ............... | H01F 17/0013 336/192 |
| 8,981,888 | B2 * | 3/2015 | Suzuki ................ | B22F 3/10 335/302 |

(Continued)

FOREIGN PATENT DOCUMENTS

JP     H10-050523 A     2/1998

*Primary Examiner* — Kyung Lee
(74) *Attorney, Agent, or Firm* — Studebaker & Brackett PC

(57) ABSTRACT

A frequency-dependent resistance element includes an element assembly composed of a sintered magnetic material and a coil conductor embedded in the element assembly. The sintered magnetic material is composed of a primary component containing Fe, Zn, Ni, and Cu and a secondary component containing Co. In the primary component, on a percent by mole basis, the Fe content is 46.79 to 47.69, the Zn content is 12.60 to 24.84, and the Ni content is 19.21 to 32.36 in terms of $Fe_2O_3$, ZnO, and NiO, respectively. The molar ratio (Ni:Zn) of Ni to Zn is (1−X):X, where X is from about 0.28 to about 0.56. The content of Co in terms of $Co_3O_4$ is 1.0 to 10.0 parts by mass relative to 100 parts by mass of the primary component containing Fe, Zn, Ni, and Cu in terms of $Fe_2O_3$, ZnO, NiO, and CuO, respectively.

20 Claims, 20 Drawing Sheets

(56) References Cited

U.S. PATENT DOCUMENTS

2010/0127812 A1* 5/2010 Maeda ................ H01F 17/0013
336/200

* cited by examiner

RESISTANCE ELEMENT AND METHOD FOR MANUFACTURING THE SAME

CROSS-REFERENCE TO RELATED APPLICATION

This application claims benefit of priority to Japanese Patent Application No. 2017-001424, filed Jan. 6, 2017, the entire content of which is incorporated herein by reference.

BACKGROUND

Technical Field

The present disclosure relates to a resistance element, in particular, a frequency-dependent resistance element and a method for manufacturing the same.

Description of the Related Art

In recent years, measures against electro-magnetic interference (EMI) with electronic equipment have been required. Regarding the technique thereof, in general, noise is shut off by inserting an impedance element in series into a signal system. Further, in general, leakage of noise of a signal system from an active element into a power supply line is suppressed by inserting an impedance element in series into a power supply line system of a power amplifier, for example.

However, it is also known that the measures against EMI that use an impedance element have disadvantages such as deformation of a signal waveform and phase delay caused by a reactance component. The impedance Za of the impedance element is formulated from a resistance component Ra corresponding to the real part and a reactance component Xa corresponding to the imaginary part and is denoted by a formula of Ra+jXa. Regarding an ideal impedance element, which efficiently absorbs a noise component and which does not cause deformation or phase delay of a signal waveform, the resistance component Ra corresponding to the real part has a large value, and a noise component is efficiently absorbed in a specific high-frequency domain including the noise component. Meanwhile, both the resistance component Ra corresponding to the real part and the reactance component Xa corresponding to the imaginary part have small values, and attenuation of the signal wave, deformation of the waveform, and phase delay do not result in the frequency domain of a signal region.

In order to obtain an element having the above-described ideal frequency characteristics, Japanese Unexamined Patent Application Publication No. 10-50523 proposes an element having a circuit in which an inductor and a resistor are connected in parallel. Specifically, regarding the element according to Japanese Unexamined Patent Application Publication No. 10-50523, an element having a circuit, in which an inductor and a resistor are connected in parallel, is obtained by disposing an oxide film that provides a resistance on the surface of an element that includes a coil conductor serving as an inductor and by connecting the coil and the oxide film in parallel.

However, it is not preferable to separately dispose the oxide film serving as a resistance element on the surface of the inductor in accordance with Japanese Unexamined Patent Application Publication No. 10-50523 because production becomes complex and the number of man-hours increases particularly in the operation of forming the film on the surface. Also, it is not preferable from the viewpoint of size reduction.

SUMMARY

The present disclosure provides an element having a similar structure as the structure of an inductor in the related art and having frequency characteristics, in which the resistance component corresponding to the real part shows a large value in a specific high-frequency domain including a noise component, and the resistance component corresponding to the real part and the reactance component corresponding to the imaginary part show small values in the frequency domain of a signal region.

The present inventors performed intensive investigations so as to solve the above-described problems. As a result, it was conjectured that a resistance element having ideal frequency characteristics would be provided by obtaining an element having an impedance in which the resistance component corresponding to the real part took on a specific value or less in a frequency domain of a signal to be passed and took on a sufficiently large value in the domain of higher frequencies, in other words, an element in which the value of the above-described resistance component sharply increased at a specific frequency. Then, it was found that an element having the above-described characteristics could be obtained by using a coil component in which a coil was embedded in an element assembly formed of a Ni—Zn—Cu-based ferrite material, wherein the contents of Fe, Zn, Ni, and Cu in the element assembly were set to be within specific ranges, the molar ratio of Ni to Zn was set to be within a specific range, and a specific amount of Co was included. Consequently, the present disclosure was realized.

According to preferred embodiments of the present disclosure, a frequency-dependent resistance element including an element assembly composed of a sintered magnetic material and a coil conductor embedded in the element assembly is provided. The sintered magnetic material is composed of a primary component containing Fe, Zn, Ni, and Cu and a secondary component containing Co, in the primary component, the Fe content is about 46.79 percent by mole or more and 47.69 percent by mole or less (i.e., from about 46.79 percent by mole to about 47.69 percent by mole) in terms of $Fe_2O_3$, the Zn content is about 12.60 percent by mole or more and 24.84 percent by mole or less (i.e., from about 12.60 percent by mole to about 24.84 percent by mole) in terms of ZnO, and the Ni content is about 19.21 percent by mole or more and 32.36 percent by mole or less (i.e., from about 19.21 percent by mole to about 32.36 percent by mole) in terms of NiO. The molar ratio (Ni:Zn) of the Ni content to the Zn content is (1−X):X, where X is about 0.28 or more and 0.56 or less (i.e., from about 0.28 to about 0.56), and the content of Co serving as the secondary component in terms of $Co_3O_4$ is about 1.0 part by mass or more and 10.0 parts by mass or less (i.e., from about 1.0 part by mass to about 10.0 parts by mass) relative to 100 parts by mass of the primary component containing Fe, Zn, Ni, and Cu in terms of $Fe_2O_3$, ZnO, NiO, and CuO, respectively.

According to preferred embodiments of the present disclosure, a method for controlling frequency characteristics of a frequency-dependent resistance element including an element assembly composed of a sintered magnetic material and a coil conductor embedded in the element assembly, the sintered magnetic material being composed of a primary component containing Fe, Zn, Ni, and Cu and a secondary component containing Co, and in the primary component, the Fe content being about 46.79 percent by mole or more and 47.69 percent by mole or less (i.e., from about 46.79 percent by mole to about 47.69 percent by mole) in terms of $Fe_2O_3$, the Zn content being about 12.60 percent by mole or more and 24.84 percent by mole or less (i.e., from about 12.60 percent by mole to about 24.84 percent by mole) in terms of ZnO, and the Ni content being about 19.21 percent by mole or more and 32.36 percent by mole or less (i.e., from about 19.21 percent by mole to about 32.36 percent by mole) in terms of NiO, is provided. The method includes the step of controlling the rising frequency of a resistance component R corresponding to the real part of the impedance or an imaginary part $\mu''$ of the complex permeability of the frequency-dependent resistance element by adjusting the molar ratio (Ni:Zn) denoted by (1−X):X of the Ni content to the Zn content, where X is within the range of about 0.28 or more and 0.56 or less (i.e., from about 0.28 to about 0.56), and by adjusting the amount of Co added as the secondary component.

According to the present disclosure, regarding a coil component, in which a coil is embedded in an element assembly of a Ni—Zn—Cu-based ferrite material, a frequency-dependent resistance element having a resistance component that sharply increases in a frequency domain with a specific frequency or more can be provided by setting the Fe content in the element assembly to be about 46.79 percent by mole or more and 47.69 percent by mole or less (i.e., from about 46.79 percent by mole to about 47.69 percent by mole) in terms of $Fe_2O_3$, setting the Zn content to be about 12.60 percent by mole or more and 24.84 percent by mole or less (i.e., from about 12.60 percent by mole to about 24.84 percent by mole) in terms of ZnO, and setting the Ni content to be about 19.21 percent by mole or more and 32.36 percent by mole or less (i.e., from about 19.21 percent by mole to about 32.36 percent by mole) in terms of NiO; setting the molar ratio of Ni to Zn included in the element assembly to be (1−X):X (where X is about 0.28 or more and 0.56 or less) (i.e., from about 0.28 to about 0.56); and including about 1.0 part by mass or more and 10.0 parts by mass or less (i.e., from about 1.0 part by mass to about 10.0 parts by mass) of Co in terms of $Co_3O_4$ relative to 100 parts by mass of the primary component containing Fe, Zn, Ni, and Cu in terms of $Fe_2O_3$, ZnO, NiO, and CuO, respectively.

Other features, elements, characteristics and advantages of the present disclosure will become more apparent from the following detailed description of preferred embodiments of the present disclosure with reference to the attached drawings.

DETAILED DESCRIPTION

A frequency-dependent resistance element according to the present disclosure and a method for manufacturing the same will be described below with reference to the drawings. It should be noted that the configuration, the shape, the number of turns of a coil, the arrangement of constituents, and the like of the frequency-dependent resistance element according to the present disclosure are not limited to the illustrated examples.

Figure 1:
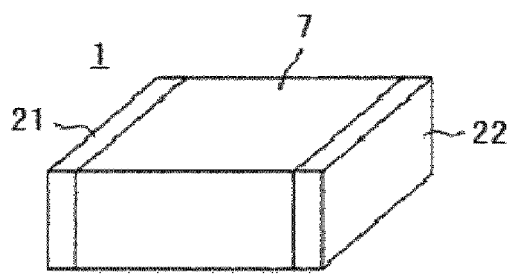
FIG. 1 is a schematic perspective view showing a frequency-dependent resistance element according to an embodiment of the present disclosure.
Figure 2:
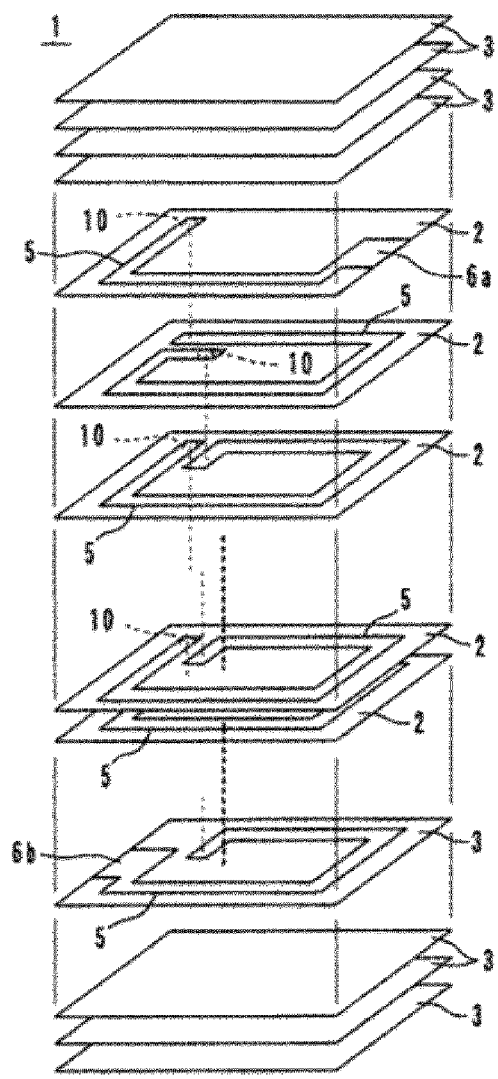
FIG. 2 is a schematic exploded perspective view showing the frequency-dependent resistance element according to the embodiment shown in FIG. 1 although outer electrodes are not shown in the drawing.
Figure 3:
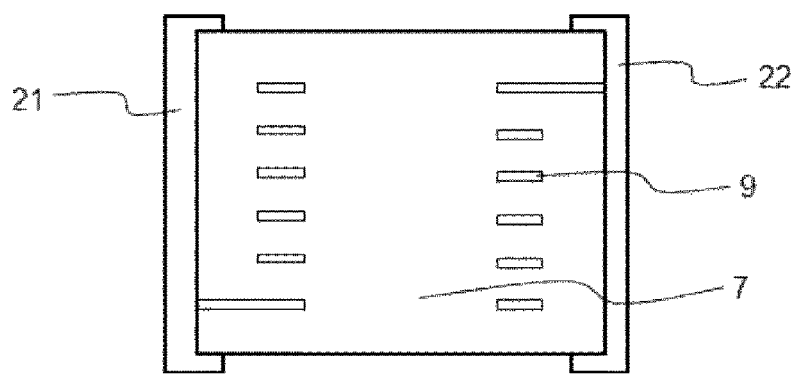
FIG. 3 is a schematic sectional view showing the frequency-dependent resistance element according to the embodiment shown in FIG. 1.

As shown in FIG. 1 to FIG. 3, a frequency-dependent resistance element 1 according to the present embodiment is formed roughly by stacking magnetic layers 2 (and magnetic layers 3 serving as outer layers) and conductor layers 5 in a predetermined order and includes an element assembly 7 composed of the magnetic layers 2 and 3 and a coil conductor 9 composed of the conductor layers 5 embedded in the element assembly 7. Outer electrodes 21 and 22 are disposed so as to cover both end surfaces of the element assembly 7 and outer perimeters of the end surfaces. The outer electrodes 21 and 22 are connected to extension portions 6b and 6a, respectively, located at both ends of the coil conductor 9.

For further details, in the present embodiment, the magnetic layers 2 have through holes 10, which pass through some of the magnetic layers 2, and are stacked in combination with the magnetic layers 3 so as to form the element assembly 7. In addition, each of conductor layers 5 is arranged between the magnetic layers 2, and these conductor layers 5 are connected to each other through the via holes 10 in the shape of a coil so as to form the coil conductor 9.

The element assembly 7 may be composed of at least a sintered magnetic material containing Fe, Zn, Ni, and Cu as a primary component. The coil conductor 9 is composed of a conductor containing a conductive metal as a primary component. The outer electrodes 21 and 22 are composed of a conductor containing a conductive metal.

The frequency-dependent resistance element 1 according to the present embodiment is produced as described below.

Magnetic sheets are prepared. The magnetic sheets are produced from a magnetic material containing Fe, Zn, Ni, and Cu as a primary component and Co as a secondary component. The magnetic material is usually prepared by mixing predetermined proportions of $Fe_2O_3$, ZnO, NiO, and CuO powders and a $Co_3O_4$ powder, which are raw materials, and performing calcination. In this regard, there is no particular limitation regarding the raw materials as long as a magnetic material containing Fe, Zn, Ni, Cu, and Co is obtained. The primary component of the above-described magnetic material is substantially composed of oxides of Fe, Zn, Ni, and Cu (ideally $Fe_2O_3$, ZnO, NiO, and CuO).

In the magnetic material, the Fe content is about 46.79 percent by mole or more and 47.69 percent by mole or less (i.e., from about 46.79 percent by mole to about 47.69 percent by mole) in terms of $Fe_2O_3$ (relative to the total primary component, the same applies hereafter), and is preferably about 47.29 percent by mole or more and 47.69 percent by mole or less (i.e., from about 47.29 percent by mole to about 47.69 percent by mole), for example, about 47.39 percent by mole or more and 47.60 percent by mole or less (i.e., from about 47.39 percent by mole to about 47.60 percent by mole).

In the magnetic material, the Zn content is about 12.60 percent by mole or more and 24.84 percent by mole or less (i.e., from about 12.60 percent by mole to about 24.84 percent by mole) in terms of ZnO (relative to the total primary component, the same applies hereafter), and is preferably about 19.36 percent by mole or more and 24.84 percent by mole or less (i.e., from about 19.36 percent by mole to about 24.84 percent by mole), for example, about 20.73 percent by mole or more and 22.10 percent by mole or less (i.e., from about 20.73 percent by mole to about 22.10 percent by mole).

In the magnetic material, the Ni content is about 19.21 percent by mole or more and 32.36 percent by mole or less (i.e., from about 19.21 percent by mole to about 32.36 percent by mole) in terms of NiO (relative to the total primary component, the same goes hereafter), and is preferably about 19.21 percent by mole or more and 25.10 percent by mole or less (i.e., from about 19.21 percent by mole to about 25.10 percent by mole), for example, about 22.17 percent by mole or more and 23.64 percent by mole or less (i.e., from about 22.17 percent by mole to about 23.64 percent by mole).

In the magnetic material, the Cu content is the remainder what is left after the above-described Fe, Zn, and Ni contents are excluded. Specifically, the Cu content is about 0.10 percent by mole or more and 21.40 percent by mole or less (i.e., from about 0.10 percent by mole to about 21.40 percent by mole) in terms of CuO (relative to the total primary component, the same goes hereafter), and is preferably about 1.00 percent by mole or more and 10.00 percent by mole or less (i.e., from about 1.00 percent by mole to about 10.00 percent by mole), for example, about 5.00 percent by mole or more and 9.00 percent by mole or less (i.e., from about 5.00 percent by mole to about 9.00 percent by mole).

In the magnetic material, the molar ratio of the Ni content to the Zn content (that is, Ni:Zn) is (1−X):X (where X is about 0.28 or more and 0.56 or less (i.e., from about 0.28 to about 0.56) and preferably about 0.44 or more 0.56 or less (i.e., from about 0.44 to about 0.56), for example, about 0.47 or more and 0.50 or less (i.e., from about 0.47 to about 0.50)).

The composition of the magnetic material is set to be within the above-described range and, thereby, the maximum value of the resistance component (also referred to as R) corresponding to the real part of the impedance of the frequency-dependent resistance element according to the present disclosure can be increased, and a rising edge of R when the frequency increases can be made steeper. In addition, the imaginary part of the complex permeability (hereafter also referred to as μ") of the frequency-dependent resistance element can be maximized by setting the composition of the magnetic material to be within the above-described range. When X is decreased, the rising frequencies of R and μ" can be shifted to the high frequency side while a larger maximum value of R is maintained.

The secondary component of the above-described magnetic material is substantially composed of an oxide of Co (ideally $Co_3O_4$). The content of Co in terms of $Co_3O_4$ in the magnetic material is about 1.0 part by mass or more and 10.0 parts by mass or less (i.e., from about 1.0 part by mass to about 10.0 parts by mass) relative to 100 parts by mass of the primary component (the amounts of Fe, Zn, Ni, and Cu in terms of $Fe_2O_3$, ZnO, NiO, and CuO, respectively), preferably about 4.0 parts by mass or more and 10.0 parts by mass or less (i.e., from about 4.0 parts by mass to about 10.0 parts by mass), and more preferably about 5.0 parts by mass or more and 10.0 parts by mass or less (i.e., from about 5.0 parts by mass to about 10.0 parts by mass). The magnetic material is made to contain Co and, thereby, the rising frequency of the frequency-dependent resistance element according to the present disclosure can be shifted to the high frequency side, and a rising edge of R when the frequency increases can be made steeper. In addition, the rising frequency of the imaginary part of the complex permeability (hereafter also referred to as μ") of the frequency-dependent resistance element can be shifted to the high frequency side by making the magnetic material contain Co.

The primary component in the above-described magnetic material may be substantially composed of Fe, Zn, Ni, and Cu and the secondary component may be substantially composed of Co, and other metal atoms (Mn, Sn, Zr, and Bi) and the like may be included.

Magnetic sheets are prepared by using the magnetic material prepared as described above. For example, magnetic sheets may be produced by mixing/kneading the magnetic material with an organic vehicle including a binder resin and an organic solvent and by performing forming into the shape of a sheet, but the method is not limited to this.

A conductor paste is separately prepared. A commercially available common metal paste containing a metal powder may be used. There is no particular limitation regarding the metal material, and examples of the metal material include Au, Ag, Cu, Pd, and Ni. Preferably, the metal material is Ag. The metal materials may be used alone or in combination.

As shown in FIG. 2, a multilayer body (corresponding to the element assembly 7 that is an unfired multilayer body) is produced, and in the multilayer body the above-described magnetic sheets (corresponding to the magnetic layers 2) are stacked with conductor paste layers (corresponding to the conductor layers 5) interposed therebetween, the conductor paste layers are connected to each other in the shape of a coil through via holes (corresponding to the via holes 10) made so as to penetrate the magnetic sheets, and the stacked layers with the coil are interposed between the magnetic sheets (corresponding to the magnetic sheets 3).

There is no particular limitation regarding the method for forming the multilayer body (unfired multilayer body), and the multilayer body may be formed by using a sheet lamination method, a printing lamination method, or the like. When the sheet lamination method is used, via holes are appropriately made in the magnetic sheets, the magnetic sheets are printed with the conductor paste in predetermined patterns (while the via holes are filled with the paste when made) so as to form conductor paste layers, the magnetic sheets appropriately provided with the conductor paste layers are stacked and pressure-bonded and cut into a predetermined dimension, thereby producing the multilayer body. When the printing lamination method is used, the multilayer body is produced by appropriately repeating a step of applying a magnetic paste composed of a magnetic material so as to form a magnetic layer and a step of applying a conductor paste in a predetermined pattern so as to form a conductor layer. When the magnetic layers are formed, via holes are made at predetermined positions such that an upper conductor layer and a lower conductor layer are electrically connected to each other, a magnetic paste is applied so as to form magnetic layers 3 (corresponding to outer layers) and cut into a predetermined dimension, thereby producing the multilayer body. A plurality of multilayer bodies may be produced in the matrix at a time and be cut into individual pieces by dicing or the like (element isolation) so as to be separated from each other. Alternatively, each multilayer body may be produced separately.

The multilayer body (unfired multilayer body) produced as described above is subjected to heat treatment such that the magnetic layers and the conductor layers are fired so as to produce the element assembly 7 and the coil conductor 9, respectively. There is no particular limitation regarding the firing condition. The condition can be appropriately selected in accordance with the composition of the magnetic material used and the metal material for the coil conductor.

There is no particular limitation regarding the firing temperature. The firing temperature is preferably about 800° C. or higher and 1,200° C. or lower (i.e., from about 800° C. to about 1,200° C.), and more preferably about 800° C. or higher and 1,000° C. or lower (i.e., from about 800° C. to about 1,000° C.), for example, about 900° C. or higher and 1,000° C. or lower (i.e., from about 900° C. to about 1,000° C.).

There is no particular limitation regarding the oxygen partial pressure during firing, and a condition at atmospheric pressure may be adopted. The oxygen partial pressure is preferably less than or equal to the equilibrium oxygen partial pressure of an oxide $M_mO_n$ (each of m and n is an arbitrary integer) of a metal material M for the coil conductor, and more preferably the $Fe_3O_4$—$Fe_2O_3$ equilibrium oxygen partial pressure or more and the M-$M_mO_n$ equilibrium oxygen partial pressure or less.

There is no particular limitation regarding the firing time. The firing time is preferably about 30 minutes or more and 10 hours or less (i.e., from about 30 minutes to about 10 hours), and more preferably about 1 hour or more and 5 hours or less (i.e., from about 1 hour to about 5 hours).

The pore area percentage of the element assembly after firing can be adjusted by adjusting the above-described firing conditions. The "pore area percentage" refers to a proportion of the area of pores (voids) in the cross section of the element assembly and can be measured as described below.

Measurement of Pore Area Percentage

The cross section demarcated in the width direction and the thickness direction of the element assembly (hereafter referred to as a "W-T" surface) is mirror-polished and subjected to focused ion beam micromachining (FIB micromachining) The resulting surface is observed using a scanning electron microscope (SEM) so as to measure the pore area percentage in the element assembly after sintering.

Specifically, the following apparatuses are used, and the measurement can be performed as described below.

FIB apparatus: FIB200TEM produced by FEI

Scanning electron microscope (FE-SEM): JSM-7500FA produced by JEOL LTD.

Image processing software: WinROOF, Ver. 5.6 produced by MITANI CORPORATION

Focused ion beam micromachining (FIB micromachining)

The polished surface of a mirror-polished sample is subjected to FIB micromachining at an incident angle of 5°.

Observation by scanning electron microscope (SEM)

The SEM observation is performed under the following conditions.

Acceleration voltage: 15 kV

Sample inclination: 0°

Signal: Secondary electrons

Coating: Pt

Magnification: 5,000 times

Calculation of Pore Area Percentage

The pore area percentage can be determined by the following method.

a) A range of measurement is determined. If the range is excessively small, an error occurs due to a measurement location. For example, the measurement range is set to be about 22.85 μm×9.44 μm.

b) When a magnetic ceramic is not easily distinguished from a pore, the brightness and the contrast are adjusted.

c) Only pores are extracted by performing binarization. When the performance by "Color extraction" of the image processing software, WinROOF, is unsatisfactory, manual operation is performed.

d) When pores are extracted, those other than the extracted pores are deleted.

e) The total area of the pores, the number of pores, the pore area percentage, and the area of the measurement range are measured with "Total area·number measurement" of the image processing software.

The pore area percentage of the element assembly of the frequency-dependent resistance element according to the present disclosure is preferably about 3% or more, more preferably about 10% or more, further preferably about 13% or more and, for example, about 15% or more. Also, the pore area percentage is preferably about 20% or less and, for example, 15% or less. The pore area percentage is preferably about 3% or more and 20% or less (i.e., from about 3% to about 20%), and more preferably 13% or more and 20% or less (i.e., from about 13% to about 20%). The rising frequencies of R and μ" can be shifted to the high frequency side by increasing the pore area percentage. On the other hand, the strength of the element assembly can be enhanced by decreasing the pore area percentage.

Subsequently, outer electrodes 21 and 22 are formed so as to cover both end surfaces of the element assembly 7 produced as described above. The outer electrodes 21 and 22 are connected to extension portions 6b and 6a, respectively, located at both ends of the coil conductor 9.

The outer electrodes 21 and 22 are composed of a conductive material and preferably at least one metal material selected from Au, Ag, Pd, Ni, Cu, and Sn. The outer electrodes are formed by coating predetermined regions of the element assembly with a material in which, for example, a metal powder is mixed with glass and the like and made into a paste, heat-treating the resulting element assembly so as to bake the metal, and performing plating. Alternatively, exposed portions of the conductor layers may be directly plated with the metal material.

In this manner, the frequency-dependent resistance element 1 according to the present embodiment is produced.

It is conjectured that the Fe content (in terms of $Fe_2O_3$), the Zn content (in terms of ZnO), the Ni content (in terms of NiO), the Cu content (in terms of CuO), and the Co content (in terms of $Co_3O_4$) in the element assembly after firing are substantially the same as the Fe content (in terms of $Fe_2O_3$), the Zn content (in terms of ZnO), the Ni content (in terms of NiO), the Cu content (in terms of CuO), and the Co content (in terms of $Co_3O_4$), respectively, in the magnetic material before firing.

That is, the frequency-dependent resistance element produced as described above includes an element assembly composed of a sintered magnetic material and a coil conductor embedded in the element assembly, wherein the sintered magnetic material is composed of a primary component containing Fe, Zn, Ni, and Cu and a secondary component containing Co, in the primary component, the Fe content is about 46.79 percent by mole or more and 47.69 percent by mole or less (i.e., from about 46.79 percent by mole to about 47.69 percent by mole) in terms of $Fe_2O_3$, the Zn content is about 12.60 percent by mole or more and 24.84 percent by mole or less (i.e., from about 12.60 percent by mole to about 24.84 percent by mole) in terms of ZnO, and the Ni content is about 19.21 percent by mole or more and 32.36 percent by mole or less (i.e., from about 19.21 percent by mole to about 32.36 percent by mole) in terms of NiO. The molar ratio (Ni:Zn) of the Ni content to the Zn content is (1−X):X, where X is about 0.28 or more and 0.56 or less (i.e., from about 0.28 to about 0.56), and the content of Co serving as the secondary component in terms of $Co_3O_4$ is about 1.0 part by mass or more and 10.0 parts by mass or less (i.e., from about 1.0 part by mass to about 10.0 parts by mass) relative to 100 parts by mass of the primary component containing Fe, Zn, Ni, and Cu in terms of $Fe_2O_3$, ZnO, NiO, and CuO, respectively.

In this regard, the content of each constituent of the primary component in the sintered magnetic material can be determined as described below. Each of a plurality of (for example, 10 or more) frequency-dependent resistance elements is fixed by a resin such that an end surface stands. Polishing is performed in the length direction of the sample, a polished surface at about half the sample in the length direction is obtained, and the polished surface is cleaned. Each constituent in a region that is inside the conductor coil and around the coil central axis is quantitatively analyzed by using wavelength dispersive X-ray spectrometry (WDX), and an average of measurement results of the plurality of samples is calculated so as to determine the content. The measurement area may differ with analyzer used. For example, the measurement beam diameter may be about 10 nm or more and 1 μm or less (i.e., from about 10 nm to about 1 μm) but is not limited to this.

Up to this point, an embodiment according to the present disclosure has been described, but the present embodiment can be variously modified.

For example, there is no particular limitation regarding the size of the frequency-dependent resistance element according to the present disclosure. The size (length×width) of the frequency-dependent resistance element according to the present disclosure is preferably about 2.0 mm or less×1.2 mm or less, more preferably about 1.6 mm or less×0.8 mm or less, and further preferably about 1.0 mm or less×0.5 mm or less. For example, the size may be about 0.6 mm or less×0.3 mm or less or about 0.4 mm or less×0.2 mm or less. The height of the frequency-dependent resistance element according to the present disclosure is preferably about 1.2 mm or less, and more preferably about 1.0 mm or less. For example, the height may be about 0.6 mm or less or 0.2 mm or less.

The number of turns of the coil in the frequency-dependent resistance element according to the present disclosure is 5.5 in the drawing but is not limited to this. The number of turns of the coil may be, for example, about 2 or more, preferably about 5 or more, and for example, about 10 or more, 30 or more, 50 or more, or 100 or more. The number of turns of the coil may be, for example, about 200 or less, preferably about 100 or less, and for example, about 60 or less, 40 or less, 30 or less, or 10 or less.

The element assembly in the frequency-dependent resistance element according to the above-described embodiment is the multilayer body composed of layers of the sintered magnetic material but is not limited to this. For example, the element assembly may be an element assembly composed of a block or be an element assembly produced by stacking two blocks.

The frequency-dependent resistance element according to the present disclosure may satisfy formula 1 described below.

$$f1 = A \times Y + B \quad \text{(formula 1)}$$

In the formula, f1 represents a frequency (MHz) that provides $R_2$, where $R_2$ represents a resistance component (Ω) corresponding to a real part of an impedance of the frequency-dependent resistance element and satisfies $R_2 = R_1 + 17$, and $R_1$ represents a resistance component (Ω) corresponding to the real part of the impedance of the frequency-dependent resistance element at 1 MHz.

That is, f1 refers to a frequency that provides R that is 17Ω larger than R at 1 MHz. In the present specification, f1 is also referred to as a rising frequency of R.

In the above-described formula, Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively, in the sintered magnetic material.

In the above-described formula, A is about 36.8 or more and 38.0 or less (i.e., from about 36.8 to about 38.0), and preferably about 37.0 or more and 37.8 or less (i.e., from about 37.0 to about 37.8). In the above-described formula, B is about 14.0 or more and 56.0 or less (i.e., from about 14.0 to about 56.0), and preferably about 14.3 or more and 55.6 or less (i.e., from about 14.3 to about 55.6). In a preferred aspect, A is about 37.0 or more and 37.8 or less (i.e., from about 37.0 to about 37.8) and B is about 14.3 or more and 55.6 or less (i.e., from about 14.3 to about 55.6).

As is clear from formula 1, the rising frequency of R (f1) of the frequency-dependent resistance element according to the present disclosure can be adjusted by adjusting the Co content.

Therefore, the present disclosure also provides a method for adjusting frequency characteristics of a frequency-dependent resistance element including an element assembly composed of a sintered magnetic material and a coil conductor embedded in the element assembly, the sintered magnetic material being composed of a primary component containing Fe, Zn, Ni, and Cu and a secondary component containing Co, and in the primary component, the Fe content being about 46.79 percent by mole or more and 47.69 percent by mole or less (i.e., from about 46.79 percent by mole to about 47.69 percent by mole) in terms of $Fe_2O_3$, the Zn content being about 12.60 percent by mole or more and 24.84 percent by mole or less (i.e., from about 12.60 percent by mole to about 24.84 percent by mole) in terms of ZnO, and the Ni content being about 19.21 percent by mole or more and 32.36 percent by mole or less (i.e., from about 19.21 percent by mole to about 32.36 percent by mole) in terms of NiO. The molar ratio of the Ni content to the Zn content (Ni:Zn) is denoted by (1−X):X, where X is about 0.28 or more and 0.56 or less (i.e., from about 0.28 to about 0.56), the method including the step of adjusting the rising frequency of a resistance component R corresponding to the real part of the impedance of the frequency-dependent resistance element by adjusting the amount of Co added so as to serve as the secondary component.

In a preferred aspect, the frequency-dependent resistance element according to the present disclosure satisfies formula 3 and formula 4 described below.

$$A = 0.046 \times Z + 36.828 \quad \text{(formula 3)}$$

$$B = 2.32 \times Z + 6.63 \quad \text{(formula 4)}$$

(in the formulae, A and B are the same as those described above, and Z represents a pore area percentage (%))

In a preferred aspect, f1 is about 50 (MHz) or more, preferably about 100 MHz or more, and more preferably about 200 MHz or more.

The frequency-dependent resistance element according to the present disclosure may satisfy formula 2 described below.

$$f2 = C \times Y^2 + D \times Y + E \quad \text{(formula 2)}$$

In the formula, f2 represents a frequency (MHz) at which $\mu''$ is 2, where $\mu''$ is an imaginary part of the complex permeability of the element assembly in the frequency-dependent resistance element. In this regard, f2 is also referred to as a rising frequency of $\mu''$.

Here, $\mu''$ can be determined on the basis of the following formula.

$$\mu'' = \frac{l_e}{\mu_0 A_e N^2} \times \frac{R_m}{2\pi f} \quad (1)$$

in the formula, $A_e$ represents an effective cross sectional area (m$^2$), $l_e$ represents an effective magnetic path length (m), $\mu_0$ represents an absolute permeability of vacuum, that is, $4\pi \times 10^{-7}$ (H/m), N represents the number of turns of the coil, f represents a frequency (Hz), and $R_m$ represents measurement resistance (Ω)).

In the above-described formula, Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively. C is about 1.78 or more and 2.60 or less (i.e., from about 1.78 to about 2.60), and preferably about 1.79 or more and 2.59 or less (i.e., from about 1.79 to about 2.59). D is about 30.00 or more and 40.00 or less (i.e., from about 30.00 to about 40.00), and preferably about 30.07 or more and 39.70 or less (i.e., from about 30.07 to about 39.70). E is about 10.00 or more and 35.00 or less (i.e., from about 10.00 to about 35.00), and preferably about 10.45 or more and 34.24 or less (i.e., from about 10.45 to about 34.24). In a preferred aspect, C is about 1.79 or more and 2.59 or less (i.e., from about 1.79 to about 2.59), D is about 30.07 or more and 39.70 or less (i.e., from about 30.07 to about 39.70), and E is about 10.45 or more and 34.24 or less (i.e., from about 10.45 to about 34.24).

As is clear from formula 2, the rising frequency of $\mu''$ (f2) of the frequency-dependent resistance element according to the present disclosure can be adjusted by adjusting the Co content.

Therefore, the present disclosure also provides a method for adjusting frequency characteristics of a frequency-dependent resistance element including an element assembly composed of a sintered magnetic material and a coil conductor embedded in the element assembly, the sintered magnetic material being composed of a primary component containing Fe, Zn, Ni, and Cu and a secondary component containing Co, and in the primary component, the Fe content being about 46.79 percent by mole or more and 47.69 percent by mole or less (i.e., from about 46.79 percent by mole to about 47.69 percent by mole) in terms of $Fe_2O_3$, the Zn content being about 12.60 percent by mole or more and 24.84 percent by mole or less (i.e., from about 12.60 percent by mole to about 24.84 percent by mole) in terms of ZnO, and the Ni content being about 19.21 percent by mole or more and 32.36 percent by mole or less (i.e., from about 19.21 percent by mole to about 32.36 percent by mole) in terms of NiO, the molar ratio of the Ni content to the Zn content (Ni:Zn) being denoted by (1−X):X, where X is about 0.28 or more and 0.56 or less (i.e., from about 0.28 to about 0.56), the method including the step of adjusting the rising frequency of an imaginary part $\mu''$ of the complex permeability of the frequency-dependent resistance element by adjusting the amount of Co added so as to serve as the secondary component.

In a preferred aspect, the frequency-dependent resistance element according to the present disclosure satisfy formula 5, formula 6, and formula 7 described below.

$$C = 0.046 \times Z + 1.61 \quad \text{(formula 5)}$$

$$D = 0.567 \times Z + 28.37 \quad \text{(formula 6)}$$

$$E = 1.385 \times Z + 5.74 \quad \text{(formula 7)}$$

in the formulae

C, D, and E are the same as those described above, and Z represents a pore area percentage (%)).

In a preferred aspect, f2 is about 30 (MHz) or more, preferably about 100 MHz or more, and more preferably about 200 MHz or more.

As described above, regarding the frequency-dependent resistance element according to the present disclosure, the rising frequencies of R and $\mu''$ and the like can be adjusted by adjusting the value of X and the amount of Co added. Therefore, the present disclosure also provides a method for controlling frequency characteristics of a frequency-dependent resistance element including an element assembly composed of a sintered magnetic material and a coil conductor embedded in the element assembly, the sintered magnetic material being composed of a primary component containing Fe, Zn, Ni, and Cu and a secondary component containing Co, and in the primary component, the Fe content being about 46.79 percent by mole or more and 47.69 percent by mole or less (i.e., from about 46.79 percent by mole to about 47.69 percent by mole) in terms of $Fe_2O_3$, the Zn content being about 12.60 percent by mole or more and 24.84 percent by mole or less (i.e., from about 12.60 percent by mole to about 24.84 percent by mole) in terms of ZnO, and the Ni content being about 19.21 percent by mole or more and 32.36 percent by mole or less (i.e., from about 19.21 percent by mole to about 32.36 percent by mole) in terms of NiO, the method including the step of controlling the rising frequency of a resistance component R corresponding to the real part of the impedance or an imaginary part $\mu''$ of the complex permeability of the frequency-dependent resistance element by adjusting the molar ratio (Ni:Zn) denoted by (1−X):X of the Ni content to the Zn content, where X is within the range of about 0.28 or more and 0.56 or less (i.e., from about 0.28 to about 0.56), and by adjusting the amount of Co added so as to serve as the secondary component.

EXAMPLES

Example 1

Production of Magnetic Sheet

A magnetic material was obtained by weighing $Fe_2O_3$, ZnO, NiO, and CuO in the ratio shown in Table 1 described below, putting the weighed materials, pure water, and partial stabilized zirconia (PSZ) balls into a vinyl chloride pot mill, performing wet mixing and pulverization for 48 hours, performing vaporization and drying, and performing calcination at a temperature of 750° C. for 2 hours.

The resulting magnetic material was mixed with an aqueous binder so as to obtain a magnetic material slurry. The resulting slurry was formed into the shape of a sheet so as to produce magnetic sheets.

Production of Multilayer Coil Component

A via hole was made at a predetermined position of each of the magnetic sheets produced as described above, and the surface of the magnetic sheet was screen-printed with a Ag paste containing a Ag powder, a varnish, and an organic solvent while the via hole was filled with the Ag paste so as to form a coil pattern. The magnetic sheets provided with the coil pattern were stacked and interposed between magnetic sheets provided with no coil pattern (refer to FIG. 2) and, thereafter, pressure-bonding was performed at a temperature of 60° C. and a pressure of 100 MPa for 1 minute so as to produce a pressure-bonded block. The resulting pressure-bonded block was cut into a predetermined size so as to produce an unfired multilayer body.

The resulting unfired multilayer body was heated to 400° C. and sufficiently degreased. The unfired multilayer body was put into a firing furnace in the air atmosphere, the temperature was increased to 950° C. and maintained for 5 hours so as to perform firing. The pore area percentage of the element assembly according to the present example was 13%.

Subsequently, an outer electrode conductive paste containing a AG powder, a glass frit, a varnish, and an organic solvent was prepared. Both ends of the above-described multilayer body was coated with the outer electrode conductive paste by being dipped into the conductive paste. This was dried and, thereafter, baking was performed in the air atmosphere at 900° C. Further, treatment for relaxing internal stress of the multilayer body was performed. Then, outer electrodes were formed by performing Ni electroplating and Sn electroplating sequentially so as to produce multilayer coil components (refer to FIG. 1) of sample Nos. 1 to 9. Each sample had a width of 0.2 mm, a length of 0.4 mm, and a thickness of 0.2 mm, and the number of turns of the coil was 10.

Evaluation (Frequency Characteristics)

Figure 4:
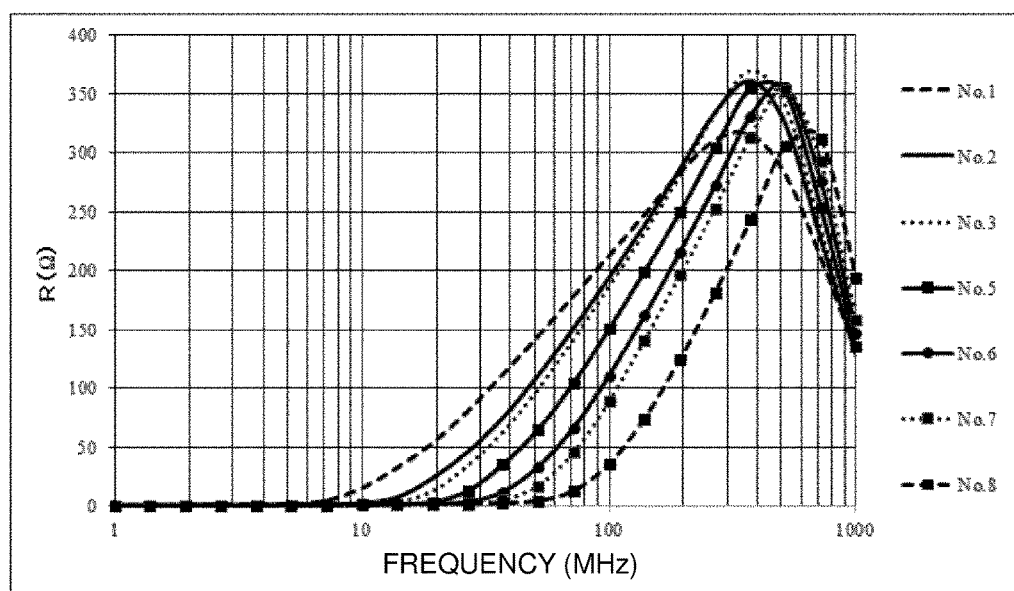
FIG. 4 is a graph showing the frequency characteristics of R of a sample produced in example 1.
Figure 5:
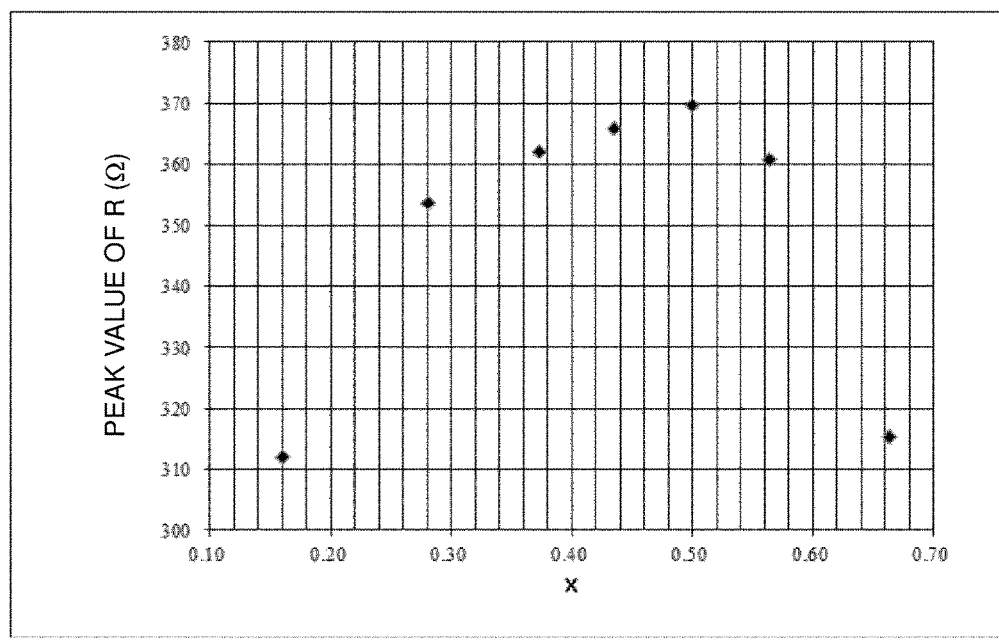
FIG. 5 is a graph showing the peak value of R of a sample produced in example 1.

The frequency characteristics of R of each of the multilayer coil components produced as described above were measured by using an impedance analyzer E4991B (produced by Agilent). The obtained results are shown in FIG. 4 (Frequency-R) and FIG. 5 (X-Peak value of R). The peak value of R was rated on the criteria described below and the results are also shown in Table 1.

less than 350Ω: x
350Ω or more: ○
360Ω or more: ⊙

TABLE 1

| | mol % | | | | | |
|---|---|---|---|---|---|---|
| Sample No. | $Fe_2O_3$ | ZnO | NiO | CuO | X | Result |
| 1 | 48.00 | 29.00 | 14.75 | 8.25 | 0.66 | X |
| 2 | 47.69 | 24.84 | 19.21 | 8.25 | 0.56 | ⊙ |
| 3 | 47.49 | 22.10 | 22.17 | 8.25 | 0.50 | ⊙ |
| 4 | 47.39 | 20.73 | 23.64 | 8.25 | 0.47 | ⊙ |
| 5 | 47.29 | 19.36 | 25.10 | 8.25 | 0.44 | ⊙ |
| 6 | 47.08 | 16.65 | 28.02 | 8.25 | 0.37 | ○ |
| 7 | 46.79 | 12.60 | 32.36 | 8.25 | 0.28 | ○ |
| 8 | 46.39 | 7.27 | 38.09 | 8.25 | 0.16 | X |
| 9 | 46.00 | 2.00 | 43.75 | 8.25 | 0.04 | X |

* X corresponds to X in (1−X):X that denotes the molar ratio of the Ni content to the Zn content.

Production of Ring-Like Sample

A predetermined number of the magnetic sheets produced as described above were stacked so as to have a thickness of about 1.0 mm. This was heated to 60° C. and was pressure-bonded by being pressurized at a pressure of 100 MPa for 60 seconds. This was stamped by using a die into the shape of substantially a ring having an outer diameter of 20 mm and an inner diameter of 10 mm. The resulting substantially ring-like multilayer body was fired in the same manner as that of the above-described multilayer coil component so as to produce substantially ring-like samples of sample Nos. 1 to 9.

Evaluation (Frequency Characteristics)

Figure 6:
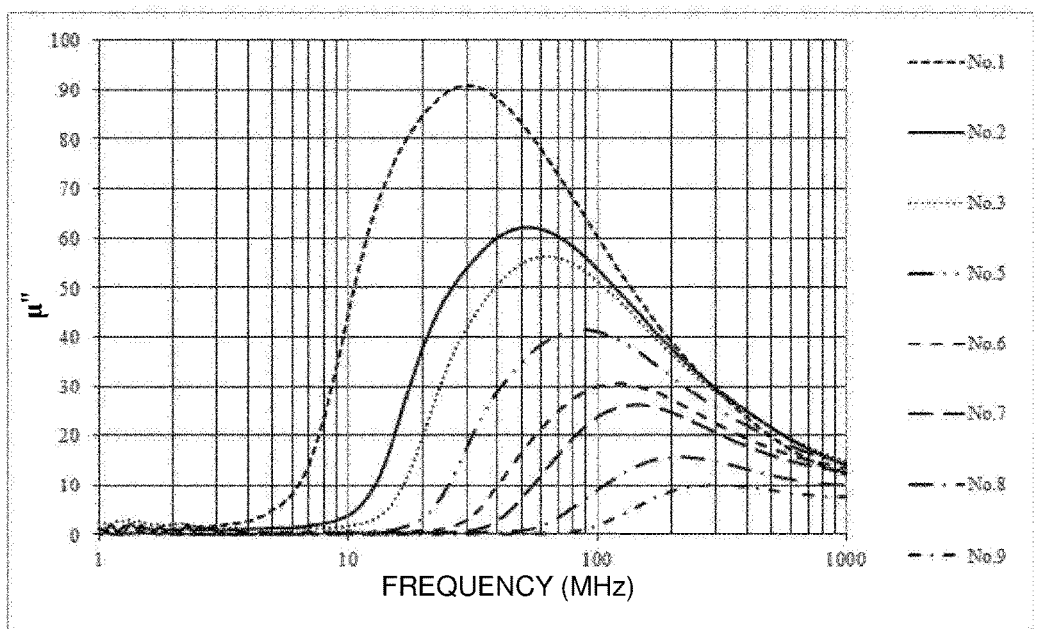
FIG. 6 is a graph showing the frequency characteristics of $\mu''$ of a sample produced in example 1.

The frequency characteristics of $\mu''$ of each of the ring-like samples produced as described above were measured by using the impedance analyzer E4991B (produced by Agilent). The obtained results are shown in FIG. 6 (Frequency-$\mu''$).

As is clear from the results shown in Table 1 described above and FIG. 4 to FIG. 6, it was ascertained that the rising frequencies of R and $\mu''$ were shifted to the high frequency side as X decreased. Also, it was ascertained that the rising edge of R became steeper as X decreased. In addition, it was ascertained that the peak value of R increased when the value of X was 0.28 or more and 0.56 or less (i.e., from about 0.28 to about 0.56), and the peak value of R further increased particularly when the value of X was 0.44 or more and 0.56 or less (i.e., from about 0.44 to about 0.56).

Example 2

Multilayer coil components and ring-like samples of sample Nos. 11 to 15 were produced in the same manner as in example 1 except that $Co_3O_4$ in the proportion shown in Table 2 (the amount relative to 100 parts by mass of the total primary component of sample No. 3) was further added to sample No. 3 in example 1. The pore area percentage of the element assembly according to the present example was also 13%.

TABLE 2

| Sample | mol % | | | | part by mass |
|---|---|---|---|---|---|
| No. | $Fe_2O_3$ | ZnO | NiO | CuO | $Co_3O_4$ |
| 11 | 47.49 | 22.10 | 22.17 | 8.25 | 0 |
| 12 | 47.49 | 22.10 | 22.17 | 8.25 | 1 |
| 13 | 47.49 | 22.10 | 22.17 | 8.25 | 3 |
| 14 | 47.49 | 22.10 | 22.17 | 8.25 | 5 |
| 15 | 47.49 | 22.10 | 22.17 | 8.25 | 10 |

Evaluation (Frequency Characteristics)

The frequency characteristic of R of each of the samples produced as described above were measured by using the impedance analyzer E4991B (produced by Agilent). The obtained results are shown in FIG. 7 (Frequency-R).

Figure 8:
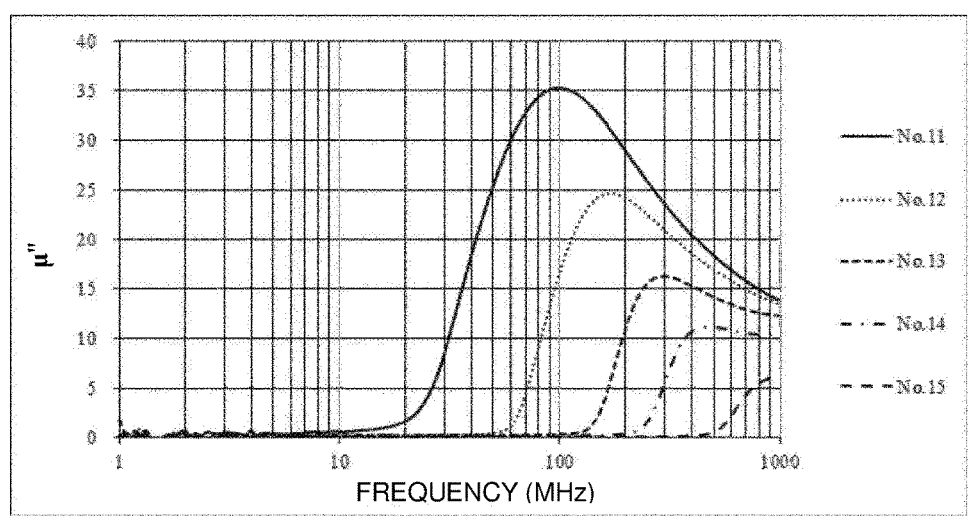
FIG. 8 is a graph showing the frequency characteristics of $\mu''$ of a sample produced in example 2.

The frequency characteristics of $\mu''$ of each of the ring-like samples produced as described above were measured by using the impedance analyzer E4991B (produced by Agilent). The obtained results are shown in FIG. 8 (Frequency-$\mu''$).

Figure 7:
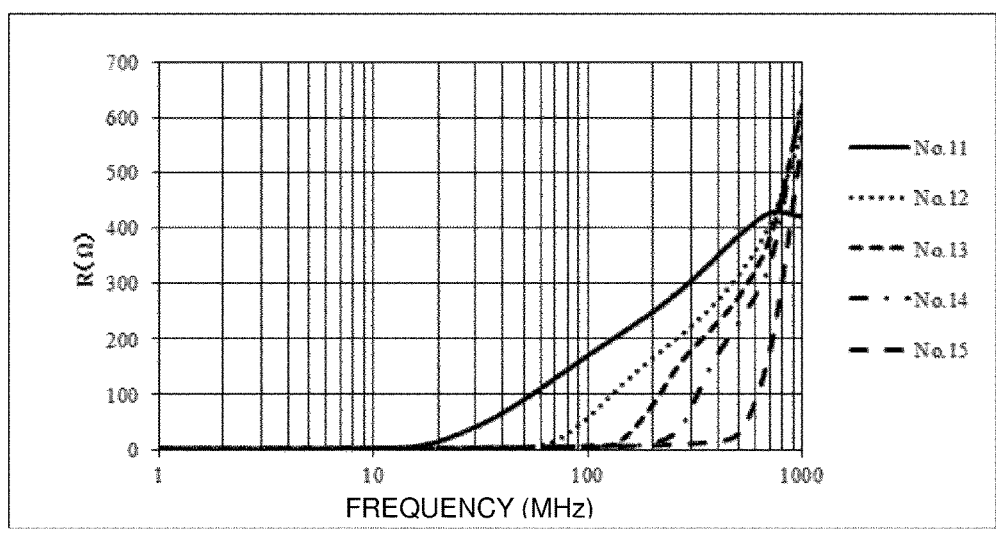
FIG. 7 is a graph showing the frequency characteristics of R of a sample produced in example 2.

As shown in FIG. 7, it was ascertained that when $Co_3O_4$ was added to the magnetic material, the rising frequency of R was shifted to the high frequency side and the rising edge of R was steep. In addition, it was ascertained that the peak value of R increased. Further, as shown in FIG. 8, it was ascertained that the rising frequency of $\mu''$ was shifted to the high frequency side by adding $Co_3O_4$ to the magnetic material.

Example 3

As shown in example 1 and example 2 described above, the rising frequencies of R and $\mu''$ were changed in accordance with the value of X and the amount of $Co_3O_4$ added. Then, the following test was performed in order to compare the degrees of rising of R and $\mu''$ between the sample in which the value of X was adjusted and the sample in which the amount of $Co_3O_4$ added was adjusted.

Figure 9:
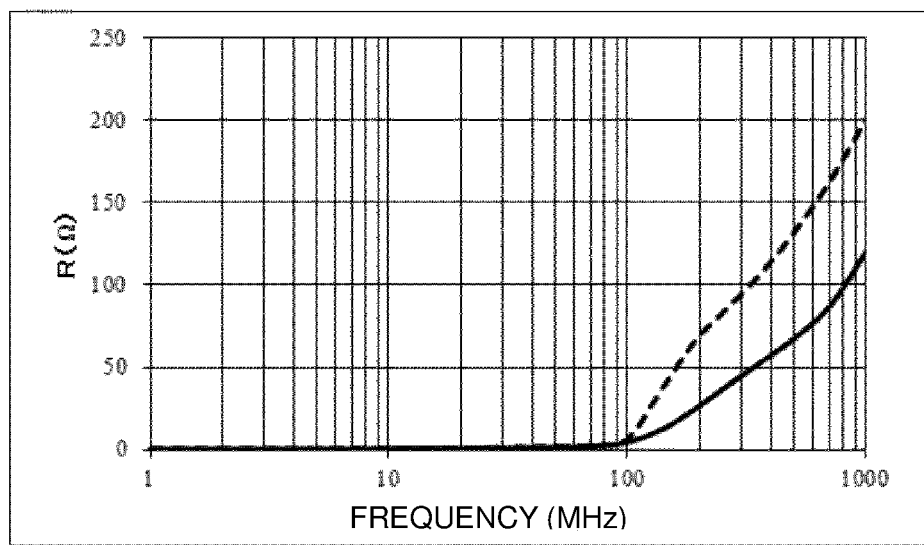
FIG. 9 is a graph showing the frequency characteristics of R of a sample produced in example 3.
Figure 10:
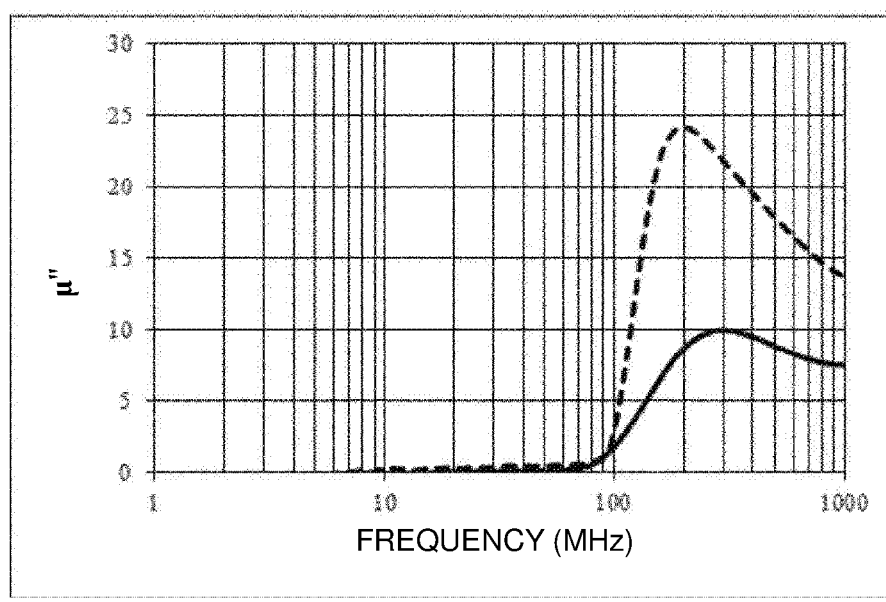
FIG. 10 is a graph showing the frequency characteristics of $\mu''$ of a sample produced in example 3.

Samples, in which R and $\mu''$ rose at about 100 MHz, were prepared by adjusting the value of X or the amount of $Co_3O_4$ added, and the frequency characteristics of R and $\mu''$ were compared. In this regard, sample No. 3 was adopted as the reference. The sample in which the value of X was adjusted was the sample of sample No. 9. Meanwhile, the sample in which the amount of $Co_3O_4$ added was adjusted was the sample having the amount of $Co_3O_4$ added of 2.6 parts by mass. The results are shown in FIG. 9 and FIG. 10. A solid line indicates sample in which the value of X was adjusted, and a broken line indicates the sample in which the amount of $Co_3O_4$ added was adjusted.

As shown in FIG. 9 and FIG. 10, the rising edges of both R and $\mu''$ of the sample in which the amount of $Co_3O_4$ added was adjusted were steeper.

As in examples 1 to 3 described above, the rising frequency of R was changed in accordance with both the value of X and the amount of $Co_3O_4$ added and the manners of changes were different from each other. Therefore, it was ascertained that the rising frequency of R could be controlled by adjusting the value of X and/or the amount of $Co_3O_4$ added. Likewise, the rising frequency of $\mu''$ was changed in accordance with both the value of X and the amount of $Co_3O_4$ added and the manners of changes were different from each other. Therefore, it was ascertained that the rising frequency of $\mu''$ could be controlled by adjusting the value of X and/or the amount of $Co_3O_4$ added. Further, the manner of rising when the value of X was changed was different from the manner of rising when the amount of $Co_3O_4$ added was changed. Therefore, it was ascertained that the manner of the rising of R and $\mu''$ could be controlled by adjusting the value of X and/or the amount of $Co_3O_4$ added. That is, it was ascertained that the frequency characteristics of the element assembly could be controlled by adjusting the value of X and/or the amount of $Co_3O_4$ added.

Example 4

Multilayer coil components of sample Nos. 21 to 35 were produced in the same manner as in example 1 except that magnetic materials having the same compositions as the compositions of sample Nos. 11 to 15 in example 2 were used, the number of turns of coil was set to be 10, and firing was performed by controlling the firing conditions so as to have the pore area percentages shown in Table 3 described below.

TABLE 3

| Sample No. | Primary component | $Co_3O_4$ (part by mass) | Pore area percentage (%) |
|---|---|---|---|
| 21 | the same as in sample No. 3 | 0 | 3 |
| 22 | the same as in sample No. 3 | 1 | 3 |
| 23 | the same as in sample No. 3 | 3 | 3 |
| 24 | the same as in sample No. 3 | 5 | 3 |
| 25 | the same as in sample No. 3 | 10 | 3 |
| 26 | the same as in sample No. 3 | 0 | 13 |
| 27 | the same as in sample No. 3 | 1 | 13 |
| 28 | the same as in sample No. 3 | 3 | 13 |
| 29 | the same as in sample No. 3 | 5 | 13 |
| 30 | the same as in sample No. 3 | 10 | 13 |
| 31 | the same as in sample No. 3 | 0 | 20 |
| 32 | the same as in sample No. 3 | 1 | 20 |
| 33 | the same as in sample No. 3 | 3 | 20 |
| 34 | the same as in sample No. 3 | 5 | 20 |
| 35 | the same as in sample No. 3 | 10 | 20 |

Evaluation (Frequency Characteristics)

Figure 11:
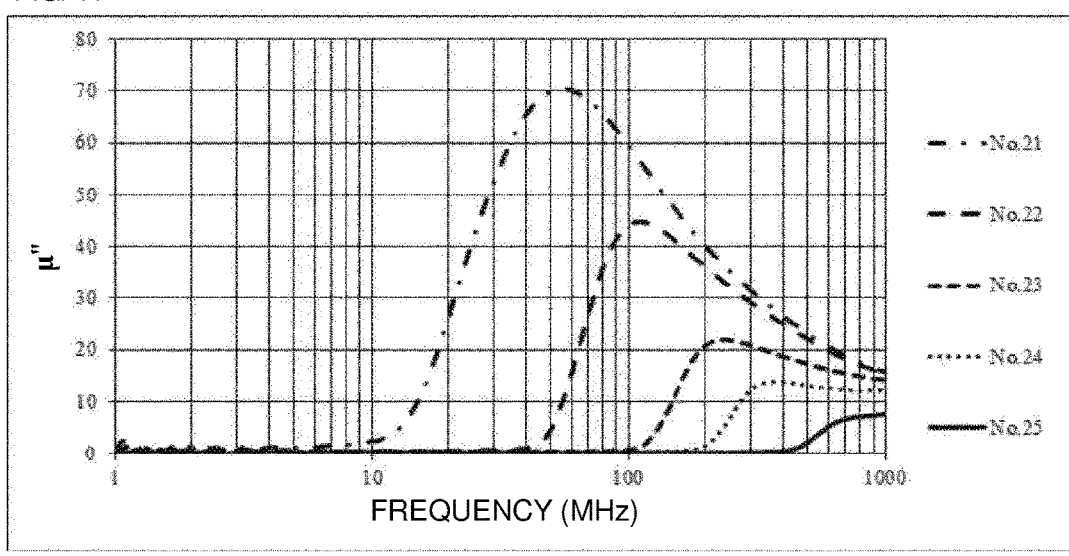
FIG. 11 is a graph showing the frequency characteristics of $\mu''$ of a sample (pore area percentage=3%) produced in example 4.
Figure 12:
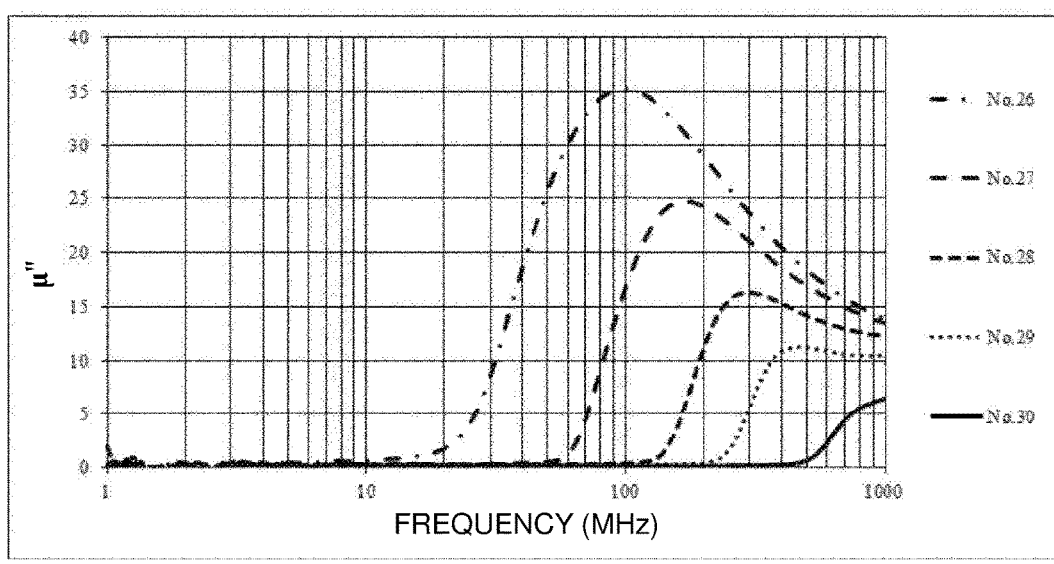
FIG. 12 is a graph showing the frequency characteristics of $\mu''$ of a sample (pore area percentage=13%) produced in example 4.
Figure 13:
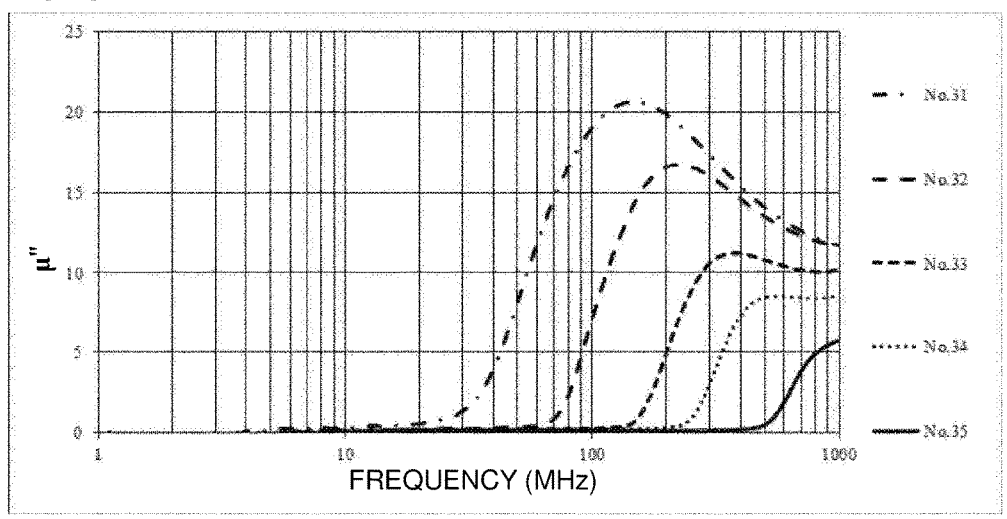
FIG. 13 is a graph showing the frequency characteristics of $\mu''$ of a sample (pore area percentage=20%) produced in example 4.

The frequency characteristics of $\mu''$ of each of the samples produced as described above were measured by using the impedance analyzer E4991B (produced by Agilent). The obtained results are shown in FIGS. 11 to 13 (Frequency-$\mu''$).

Figure 14:
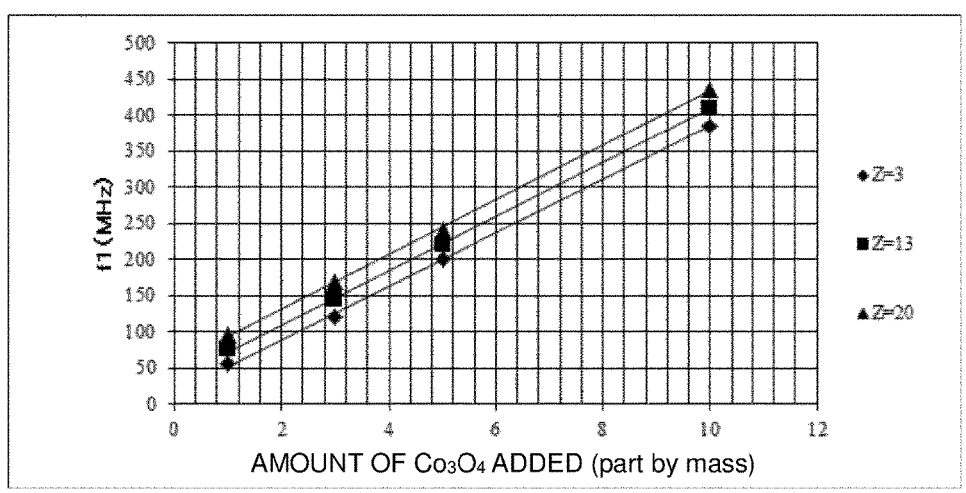
FIG. 14 is a graph showing the relationship between the amount of $Co_3O_4$ added and f1 of a sample produced in example 4.
Figure 15:
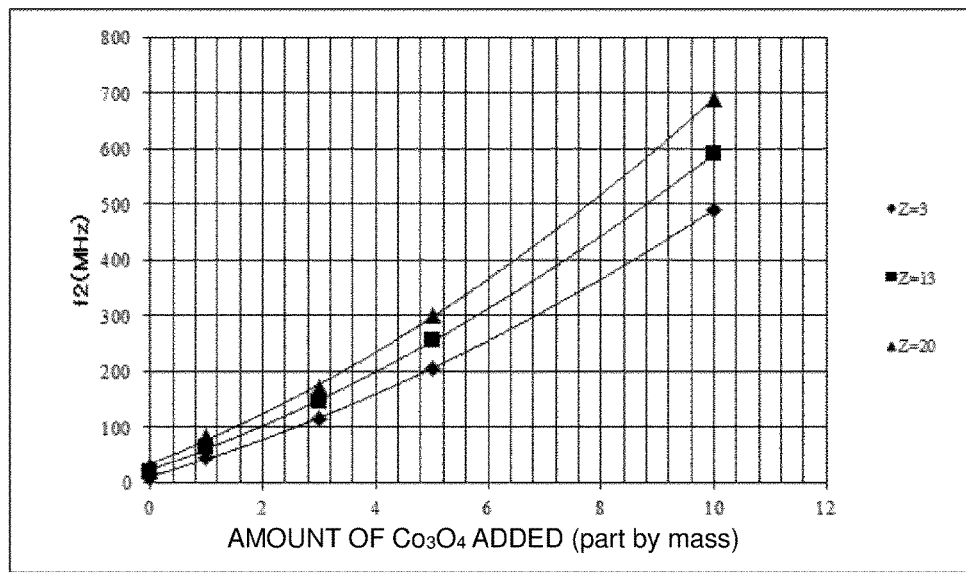
FIG. 15 is a graph showing the relationship between the amount of $Co_3O_4$ added and f2 of a sample produced in example 4.

The above-described results were plotted on the amount of $Co_3O_4$ added-f1 (rising frequency of R) diagram (FIG. 14) and the amount of $Co_3O_4$ added-f2 (rising frequency of $\mu''$) diagram (FIG. 15), and an approximate straight line and an approximate curve of each pore area percentage (Z %) were determined. The resulting approximate expressions are shown in Table 4 escribed below.

TABLE 4

| | Pore area percentage | Approximate expression |
|---|---|---|
| f1 | 3% | y = 36.983x + 14.330 |
| | 13% | y = 37.374x + 34.972 |
| | 20% | y = 37.765x + 55.615 |
| f2 | 3% | y = 1.789x$^2$ + 30.066x + 10.451 |

TABLE 4-continued

| Pore area percentage | Approximate expression |
|---|---|
| 13% | y = 2.101x² + 35.752x + 22.409 |
| 20% | y = 2.589x² + 39.704x + 34.238 |

As shown in FIGS. 11 to 13, it was ascertained that the rising frequency of µ" was shifted to the high frequency side by adding $Co_3O_4$ to the magnetic material. Also, it was ascertained that as the pore area percentage increased, the rising frequency of µ" was shifted to the higher frequency side. That is, the rising frequency of µ", which serves as a factor in determining R can be controlled and, therefore, the rising frequency of R can be controlled.

As shown in Table 4 described above, it was ascertained that each of the rising frequency of R (f1) and the rising frequency of µ" (f2) could be calculated on a pore area percentage of the element assembly basis by the mathematical expression shown in Table 4.

Figure 16:
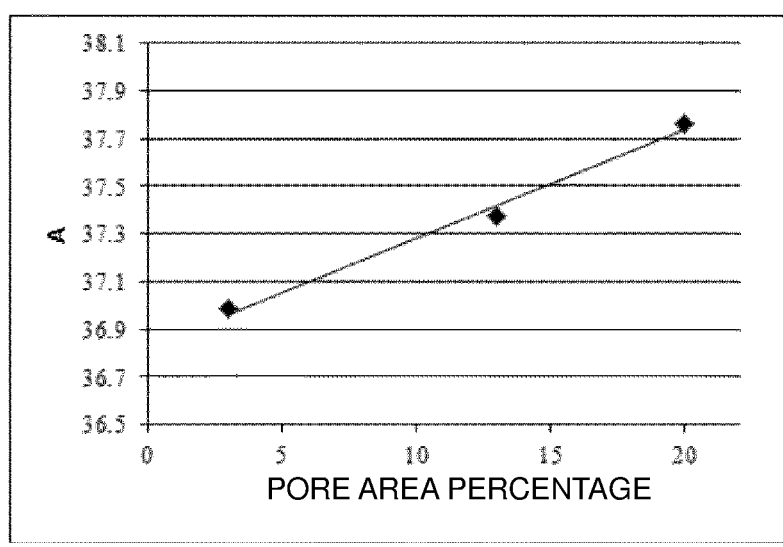
FIG. 16 is a graph showing the relationship between the coefficient of x of an approximate expression shown in FIG. 14 and the pore area percentage (%)
Figure 17:
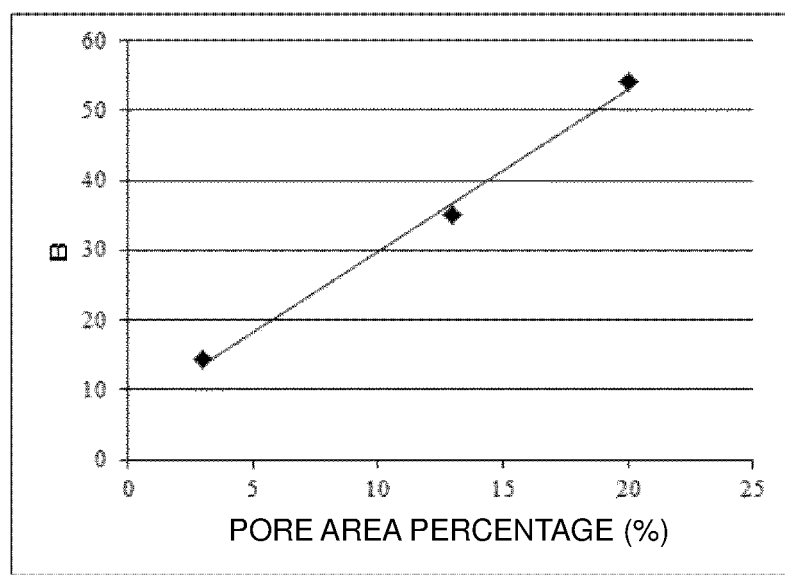
FIG. 17 is a graph showing the relationship between the intercept of an approximate expression shown in FIG. 14 and the pore area percentage (%)
Figure 18:
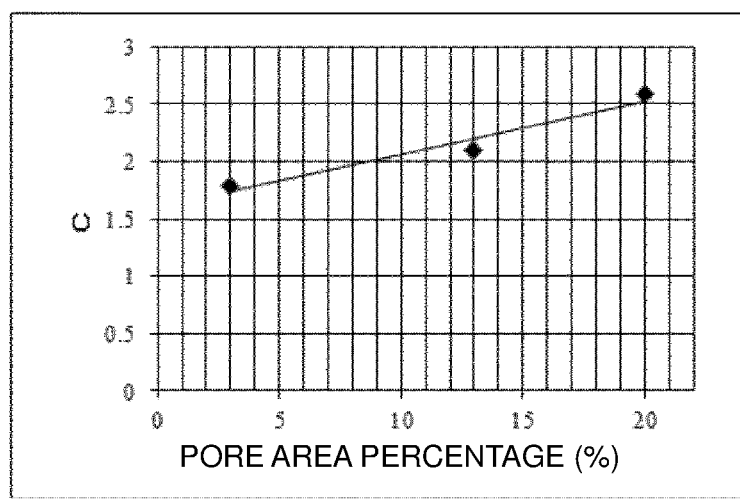
FIG. 18 is a graph showing the relationship between the coefficient of $x^2$ of an approximate expression shown in FIG. 15 and the pore area percentage (%)
Figure 19:
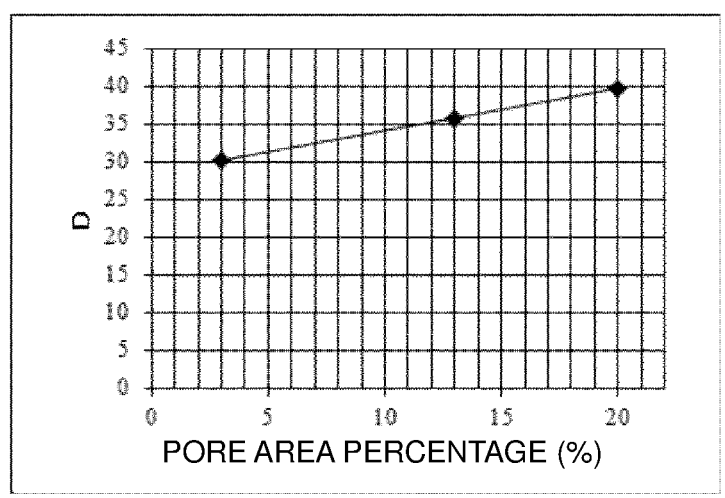
FIG. 19 is a graph showing the relationship between the coefficient of x of an approximate expression shown in FIG. 15 and the pore area percentage (%)
Figure 20:
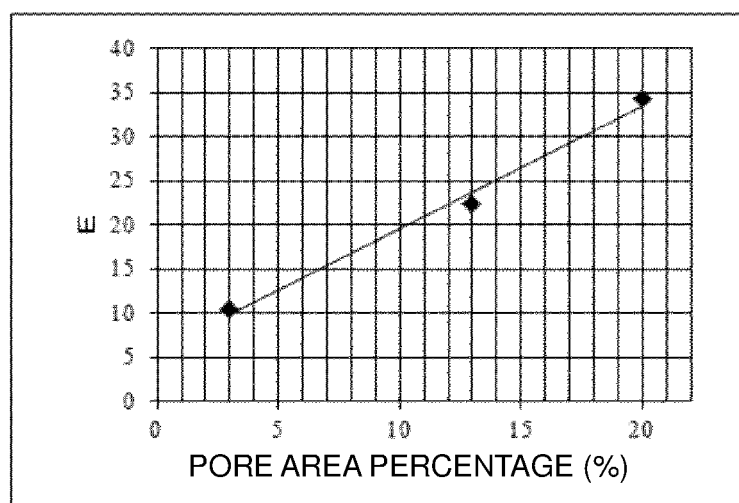
FIG. 20 is a graph showing the relationship between the intercept of an approximate expression shown in FIG. 15 and the pore area percentage (%).

In addition, the relationship between the coefficient (A) of x and the pore area percentage (%) and the relationship between the intersect (B) and the pore area percentage (%) of the approximate expression of f1 were plotted on FIG. 16 and FIG. 17, respectively, and approximate straight lines were determined. Likewise, the relationship between the coefficient (C) of $x^2$ and the pore area percentage (%), the relationship between the coefficient (D) of x and the pore area percentage (%), and the relationship between the intersect (E) and the pore area percentage (%) of the approximate expression of f2 were plotted on FIG. 18, FIG. 19, and FIG. 20, respectively, and approximate straight lines were determined. The resulting approximate expressions are shown in Table 5 described below.

TABLE 5

| | Approximate expression |
|---|---|
| A | y = 0.045x + 36.828 |
| B | y = 2.319x + 6.628 |
| C | y = 0.046x + 1.608 |
| D | y = 0.567x + 28.369 |
| E | y = 1.385x + 5.742 |

As shown in Table 5, it was ascertained that each of the coefficients and the intersects for calculating f1 and f2 was proportional to the pore area percentage and could be calculated by using the mathematical expression shown in Table 5.

The frequency-dependent resistance element according to the present disclosure is suitable for use as, in particular, an element that is a measure against EMI.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A frequency-dependent resistance element comprising:
an element assembly composed of a sintered magnetic material; and
a coil conductor embedded in the element assembly,
the sintered magnetic material is composed of a primary component containing Fe, Zn, Ni, and Cu and a secondary component containing Co,
in the primary component, an Fe content is from 46.79 percent by mole to 47.69 percent by mole in terms of $Fe_2O_3$, the Zn content is from 12.60 percent by mole to 24.84 percent by mole in terms of ZnO, and the Ni content is from 19.21 percent by mole to 32.36 percent by mole in terms of NiO,
a molar ratio (Ni:Zn) of the Ni content to the Zn content is (1−X):X, where X is from 0.28 to 0.56, and
a content of Co serving as the secondary component in terms of $Co_3O_4$ is from 1.0 part by mass to 10.0 parts by mass relative to 100 parts by mass of the primary component containing Fe, Zn, Ni, and Cu in terms of $Fe_2O_3$, ZnO, NiO, and CuO, respectively.

2. The frequency-dependent resistance element according to claim 1, wherein X is from 0.44 to 0.56.

3. The frequency-dependent resistance element according to claim 2, wherein a pore area percentage of the element assembly is from 3% to 20%.

4. The frequency-dependent resistance element according to claim 2, wherein a formula 1 is satisfied:

$$f1 = A \times Y + B \quad \text{(formula 1)}$$

and in the formula 1:
f1 represents a frequency (MHz) that provides $R_2$,
where $R_2$ represents a resistance component (Q) corresponding to a real part of an impedance of the frequency-dependent resistance element and satisfies $R_2 = R_1 + 17$, and
$R_1$ represents a resistance component (Q) corresponding to the real part of the impedance of the frequency-dependent resistance element at 1 MHz,
Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively, in the sintered magnetic material,
A is from 36.8 to 38.0, and
B is from 14.0 to 56.0.

5. The frequency-dependent resistance element according to claim 2, wherein a formula 2 is satisfied:

$$f2 = C \times Y^2 + D \times Y + E \quad \text{(formula 2)}$$

and in the formula 2:
f2 represents a frequency (MHz) at which µ" is 2, where µ" is an imaginary part of the complex permeability of the frequency-dependent resistance element,
Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively, in the sintered magnetic material,
C is from 1.78 to 2.60,
D is from 30.00 to 40.00, and
E is from 10.00 to 35.00.

6. The frequency-dependent resistance element according to claim 2, wherein the element assembly is a multilayer body composed of a plurality of layers of the sintered magnetic material.

7. The frequency-dependent resistance element according to claim 1, wherein a pore area percentage of the element assembly is from 3% to 20%.

8. The frequency-dependent resistance element according to claim 1, wherein a formula 1 is satisfied:

$$f1 = A \times Y + B \quad \text{(formula 1)}$$

and in the formula 1:
f1 represents a frequency (MHz) that provides $R_2$, where $R_2$ represents a resistance component (Ω) corresponding to a real part of an impedance of the frequency-dependent resistance element and satisfies $R_2=R_1+17$, and $R_1$ represents a resistance component (Ω) corresponding to the real part of the impedance of the frequency-dependent resistance element at 1 MHz, Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively, in the sintered magnetic material, A is from 36.8 to 38.0, and B is from 14.0 to 56.0.

9. The frequency-dependent resistance element according to claim 8, wherein a formula 3 and a formula 4 are satisfied:

$$A=0.046 \times Z+36.828 \quad \text{(formula 3)}$$

$$B=2.32 \times Z+6.63 \quad \text{(formula 4)}$$

and in the formulae 3 and 4:

A and B are the same as in claim 4, and

Z represents a pore area percentage.

10. The frequency-dependent resistance element according to claim 8, wherein f1 is 50 MHz or more.

11. The frequency-dependent resistance element according to claim 1, wherein a formula 2 is satisfied:

$$f2=C \times Y^2+D \times Y+E \quad \text{(formula 2)}$$

and in the formula 2:

f2 represents a frequency (MHz) at which μ" is 2, where μ" is an imaginary part of the complex permeability of the frequency-dependent resistance element, Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively, in the sintered magnetic material, C is from 1.78 to 2.60, D is from 30.00 to 40.00, and E is from 10.00 to 35.00.

12. The frequency-dependent resistance element according to claim 11, wherein a formula 5, a formula 6, and a formula 7 are satisfied:

$$C=0.046 \times Z+1.61 \quad \text{(formula 5)}$$

$$D=0.567 \times Z+28.37 \quad \text{(formula 6)}$$

$$E=1.385 \times Z+5.74 \quad \text{(formula 7)}$$

and in the formulae 5, 6 and 7:

C, D, and E are the same as in claim 11, and

Z represents a pore area percentage.

13. The frequency-dependent resistance element according to claim 1, wherein the element assembly is a multilayer body composed of a plurality of layers of the sintered magnetic material.

14. The frequency-dependent resistance element according to claim 13, wherein the plurality of layers of the sintered magnetic material are stacked with conductor layers interposed therebetween, and the layers define holes via which the conductor layers electrically connect to each other.

15. A method for controlling frequency characteristics of a frequency-dependent resistance element including an element assembly composed of a sintered magnetic material and a coil conductor embedded in the element assembly, the sintered magnetic material being composed of a primary component containing Fe, Zn, Ni, and Cu and a secondary component containing Co, and in the primary component, the Fe content being from 46.79 percent by mole to 47.69 percent by mole in terms of $Fe_2O_3$, the Zn content being from 12.60 percent by mole to 24.84 percent by mole in terms of ZnO, and the Ni content being from 19.21 percent by mole to 32.36 percent by mole in terms of NiO, the method comprising:

controlling a rising frequency of a resistance component R corresponding to a real part of the impedance or an imaginary part μ" of the complex permeability of the frequency-dependent resistance element by adjusting a molar ratio (Ni:Zn) denoted by (1−X):X of the Ni content to the Zn content, where X is within a range from 0.28 to 0.56, and by adjusting an amount of Co added as the secondary component.

16. The method according to claim 15, wherein the controlling a rising frequency of a resistance component R includes adjusting the molar ratio (Ni:Zn) where X is from 0.44 to 0.56.

17. The method according to claim 15, wherein in the controlling a rising frequency of a resistance component, a formula 1 is satisfied:

$$f1=A \times Y+B \quad \text{(formula 1)}$$

and in the formula 1:

f1 represents a frequency (MHz) that provides $R_2$, where $R_2$ represents a resistance component (Ω) corresponding to a real part of an impedance of the frequency-dependent resistance element and satisfies $R_2=R_1+17$, and $R_1$ represents a resistance component (Ω) corresponding to the real part of the impedance of the frequency-dependent resistance element at 1 MHz, Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively, in the sintered magnetic material, A is from 36.8 to 38.0, and B is from 14.0 to 56.0.

18. The method according to claim 17, wherein in the controlling a rising frequency of a resistance component, a formula 3 and a formula 4 are satisfied:

$$A=0.046 \times Z+36.828 \quad \text{(formula 3)}$$

$$B=2.32 \times Z+6.63 \quad \text{(formula 4)}$$

and in the formulae 3 and 4:

A and B are the same as in claim 8, and

Z represents a pore area percentage.

19. The method according to claim 15, wherein in the controlling a rising frequency of a resistance component, a formula 2 is satisfied:

$$f2=C \times Y^2+D \times Y+E \quad \text{(formula 2)}$$

and in the formula 2:

f2 represents a frequency (MHz) at which μ" is 2, where μ" is an imaginary part of the complex permeability of the frequency-dependent resistance element, Y represents the content (part by mass) of Co in terms of $Co_3O_4$ relative to 100 parts by mass of the primary component containing Fe, Zn, Ni, and Cu in terms of $Fe_2O_3$, ZnO, NiO, and CuO, respectively, in the sintered magnetic material, C is from 1.78 to 2.60, D is from 30.00 to 40.00, and E is from 10.00 to 35.00.

20. The method according to claim 19, wherein in the controlling a rising frequency of a resistance component, a formula 5, a formula 6, and a formula 7 are satisfied:

$$C = 0.046 \times Z + 1.61 \quad \text{(formula 5)}$$

$$D = 0.567 \times Z + 28.37 \quad \text{(formula 6)}$$

$$E = 1.385 \times Z + 5.74 \quad \text{(formula 7)}$$

and in the formulae 5, 6 and 7:
C, D, and E are the same as in claim 11, and
Z represents a pore area percentage.

\* \* \* \* \*